United States Patent Office 3,560,482
Patented Feb. 2, 1971

---

3,560,482
METHOD FOR PRODUCING BENZODIAZEPINE DERIVATIVES
Hisao Yamamoto, Nishinomiya-shi, Shigeho Inaba, Takarazuka-shi, Tadashi Okamoto, Ashiya-shi, Toshiyuki Hirohashi, Kobe, Kikuo Ishizumi, Minoo-shi, Michihiro Yamamoto, Takarazuka-shi, Isamu Maruyama, Minoo-shi, Kazuo Mori, Kobe, and Tsuyoshi Kobayashi, Minoo-shi, Japan, assignors to Sumitomo Chemical Company, Ltd., Osaka, Japan
No Drawing. Filed Nov. 29, 1968, Ser. No. 780,207
Claims priority, application Japan, Dec. 8, 1967, 42/78,906; Dec. 9, 1967, 42/79,161; Dec. 12, 1967, 42/79,921, 42/79,922; Apr. 25, 1968, 43/28,172
Int. Cl. C07d 53/06
U.S. Cl. 260—239.3
4 Claims

ABSTRACT OF THE DISCLOSURE

Benzodiazepine derivatives of the formula,

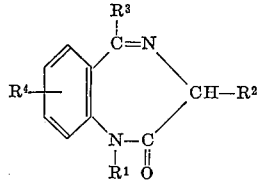

wherein $R^1$ and $R^2$ are respectively hydrogen or alkyl; $R^3$ is cycloalkyl, unsubstituted or alkyl- or halogen-substituted pyridyl, furyl or thienyl, etc. and $R^4$ is hydrogen, halogen, nitro, alkyl, alkoxy, haloalkyl or alkylsulfonyl, which have excellent tranquilizing effect are produced by reacting a 2-aminomethylindole derivative of the formula,

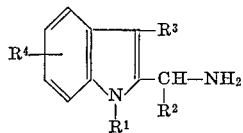

wherein $R^1$, $R^2$, $R^3$ and $R^4$ have the same meanings as defined above or a salt thereof, with an oxidizing agent.

---

The present invention relates to a method for producing benzodiazepine derivatives. More particularly, the invention pertains to a novel method for producing benzodiazepine derivatives represented by the Formula I,

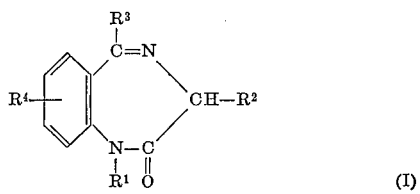

wherein $R^1$ and $R^2$ are hydrogen or alkyl having 1 to 3 carbon atoms; $R^3$ is cycloalkyl having 3–7 carbon atoms, unsubstituted or alkyl- or halogen-substituted 5- or 6-membered heterocyclic ring containing oxygen, sulfur or nitrogen and $R^4$ is hydrogen, halogen, nitro, alkyl having 1 to 3 carbon atoms, alkoxy having 1 to 3 carbon atoms, haloalkyl or alkylsulfonyl.

The benzodiazepine derivatives represented by the Formula I are known as a remarkably effective tranquilizer, musclerelaxant, anti-convulsant and hypnotic.

A few processes for producing the benzodiazepine derivatives have been described. For instance, which is one of the most useful procedures by now, a benzodiazepine derivative is obtained by reacting a 2-bromoacetamido-phenylpyridylketone derivative with ammonia, or 2-aminobenzophenone derivative with glycine hydrochloride or glycine ethyl ester. (Belgian Pat. 619,101).

Another benzodiazepine derivative, which is included in this invention, is also prepared by contacting a (2-aminophenyl)-cycloalkylketone derivative with glycine ethyl ester (U.S. Pat. 3,338,886).

Contrary to these procedures, we have found, unexpectedly, that benzodiazepine derivatives of the Formula I can be smoothly and economically prepared in high yield and high purity by reacting a novel 2-aminomethyl-indole derivative having the Formula II

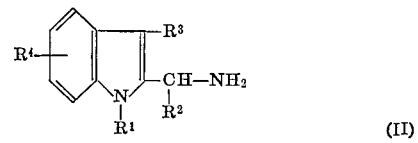

wherein $R^1$, $R^2$, $R^3$ and $R^4$ have the same meanings as defined above, or a salt thereof with an appropriate oxidizing agent. Such a process for converting a 5-membered ring compound into a 7-membered ring compound by ring expansion reaction has not heretofore been described or suggested in the literature. The useful present process thus differs markedly from the known methods and represents an improvement thereover.

These novel starting materials, 2-aminomethylindole derivatives are prepared easily, for example, by the reduction of indole-2-carboxamide derivatives.

These indole-2-carboxamide derivatives are prepared by the amidation of indole-2-carboxylic acid derivatives in good yield. Further, the indole-2-carboxylic and derivatives are obtained, for example, by the cyclization of benzene diazonium compounds with ester derivatives of α-benzyl-β-keto acid. And further, the alkylation of the indole-2-carboxylic acid derivatives gives 1-alkylated indole-2-carboxylic acid derivatives, from which are prepared the corresponding 2-aminomethylindole derivatives according to the same procedure described above.

And further, if $R^2$ is alkyl, 2-aminomethylindole derivatives II are produced by reacting the corresponding indole-2-carbonitrile derivative with an alkyl magnesium halide to yield an iminomethylindole derivative and then reducing the resultant iminomethylindole derivatives to yield the desired 2-aminomethylindole derivatives II.

All of these processes proceed smoothly and give the objective products in high yield, so these procedures are very much useful in practice.

One object of the present invention is to provide a novel process for preparing benzodiazepine derivatives represented by the Formula I.

Another object is to provide a novel process for producing the salts of benzodiazepine derivatives by treating the benzodiazepine derivatives of the Formula I with a mineral acid or an organic acid.

Other objects of the present invention will be apparent from the following description.

In order to accomplish these objects, the present invention provides a method for producing benzodiazepine derivatives represented by the Formula I, which comprises reacting a 2-aminomethylindole derivative represented by the Formula II or its salt with an oxidizing agent.

Further the present invention provides a method for producing salts of benzodiazepine derivatives of the Formula I, which comprises reacting a 2-aminomethylindole derivative of the Formula II or its salt with an oxidizing agent to yield the benzodiazepine derivative of the Formula I and reacting the benzodiazepine derivative of the Formula I with a mineral acid or an organic acid.

In the compound represented by the aforesaid Formulae I and II, the alkyl includes straight or branched alkyl such as methyl, ethyl, n-propyl, iso-propyl; the alkoxy includes methoxy, ethoxy, n-propoxy, iso-propoxy; the 5- or 6-membered heterocyclic ring includes pyridyl, pyrrolyl, pyrrolidinyl, furyl and thienyl; cycloalkyl ring includes cyclopropyl, cyclobutyl, cyclopentyl, cyclohexyl, or cycloheptyl; halogen includes chlorine, bromine, iodine and fluorine; and the haloalkyl includes trifluoromethyl.

In carrying out the method for producing the benzodiazepine derivatives according to the present invention, 2-aminomethylindole derivatives represented by the Formula II or their salts are reacted with an appropriate oxidizing agent, for example, ozone, hydrogen peroxide, peracid (e.g. performic acid, peracetic acid and perbenzoic acid), chromic acid and potassium permanganate. The oxidizing agent used in the process of the invention is not limited, however, only to those exemplified above. The reaction is generally readily effected at room temperature. Higher or lower temperature is sometimes found more satisfactory.

Chromic anhydride or ozone is preferred as oxidizing agent. The reaction may preferably be carried out in the presence of a solvent. The solvent depends upon the oxidizing agents used, and is selected from water, acetone, carbon tetrachloride, acetic acid, sulfuric acid and the like. The oxidizing agent is used in a stoichiometric amount or more.

A 2-aminomethylindole derivative or its salt such as hydrochloride, hydrobromide, sulfate, nitrate, acetate and the like is dissolved or suspended in a solvent and an oxidizing agent is added to the solution or suspension with stirring. The reaction is generally completed within about 24 hours.

The desired benzodiazepine derivative can be separated from the reaction mixture in a crude form by extraction after neutralization or without neutralization and by evaporation to dryness. The product may be further purified, if desired, by recrystallization from an appropiate solvent such as ethanol, isopropanol and the like.

Thus, for example, the invention includes benzodiazepine derivatives such as 5-(2'-pyridyl)-1,3-dihydro-2H-1,4-benzodiazepine-2-one
5-(2'-pyridyl)-7-chloro-1,3-dihydro-2H-1,4-benzodiazepine-2-one
5-(2'-pyridyl)-1-methyl-7-chloro-1,3-dihydro-2H-1,4-benzodiazepine-2-one
5-(2'-pyridyl)-7-bromo-1,3-dihydro-2H-1,4-benzodiazepine-2-one
5-(2'-pyridyl)-1-methyl-7-bromo-1,3,dihydro-2H-1,4-benzodiazepine-2-one
5-(2'-pyridyl)-3-methyl-7-bromo-1,3-dihydro-2H-1,4-benzodiazepine-2-one
5-(2'-pyridyl)-7-nitro-1,3-dihydro-2H-1,4-benzodiazepine-2-one
5-[2'-(3'-methylpyridyl)]-7-chloro-1,3-dihydro-2H-1,4-benzodiazepine-2-one
5-(2'-thienyl)-7-nitro-1,3-dihydro-2H-1,4-benzodiazepine-2-one
5-[2'-(5'-methylthienyl)]-7-chloro-1,3-dihydro-2H-1,4-benzodiazepine-2-one
5-[2'-(5'-chloro-thienyl)]-7-chloro-1,3-dihydro-2H-1,4-benzodiazepine-2-one
5-(3'-thienyl)-7-chloro-1,3-dihydro-2H-1,4-benzodiazepine-2-one
5-(2'-furyl)-7-chloro-1,3-dihydro-2H-1,4-benzodiazepine-2-one
5-[2'-(3'-methyl-furyl)]-7-chloro-1,3-dihydro-2H-1,4-benzodiazepine-2-one
5-[2'-(5'-chloro-furyl)]-7-chloro-1,3-dihydro-2H-1,4-benzodiazepine-2-one
5-(2'-pyridyl)-8-chloro-1,3-dihydro-2H-1,4-benzodiazepine-2-one
5-cyclopentyl-1,3-dihydro-2H-1,4-benzodiazepine-2-one
5-cyclopentyl-7-chloro-1,3-dihydro-2H-1,4-benzodiazepine-2-one
5-cyclohexyl-1,3-dihydro-2H-1,4-benzodiazepine-2-one
5-cyclohexyl-7-chloro-1,3-dihydro-2H-1,4-benzodiazepine-2-one
5-cyclohexyl-7-nitro-1,3-dihydro-2H-1,4-benzodiazepine-2-one
5-cyclohexyl-7-methyl-1,3-dihydro-2H-1,4-benzodiazepine-2-one
5-cyclohexyl-7-methoxy-1,3-dihydro-2H-1,4-benzodiazepine-2-one
5-cyclohexyl-7-methylsulfonyl-1,3-dihydro-2H-1,4-benzodiazepine-2-one
5-[2'-(4'-methyl-pyridyl)]-7-chloro-1,3-dihydro-2H-1,4-benzodiazepine-2-one
5-[2'-(4',6'-dichloro-pyridyl)]-7-chloro-1,3-dihydro-2H-1,4-benzodiazepine-2-one
5-(3'-pyridyl)-7-chloro-1,3-dihydro-2H-1,4-benzodiazepine-2-one
5-[4'-(2'-methyl-pyridyl)]-7-bromo-1,3-dihydro-2H-1,4-benzodiazepine-2-one
5-[4'-(2'-chloro-pyridyl)]-7-chloro-1,3-dihydro-2H-1,4-benzodiazepine-2-one
5-(2'-thienyl)-1,3-dihydro-2H-1,4-benzodiazepine-2-one
1-methyl-5-(2'-thienyl)-1,3-dihydro-2H-1,4-benzodiazepine-2-one
5-(2'-thienyl)-7-chloro-1,3-dihydro-2H-1,4-benzodiazepine-2-one
1-methyl-5-cyclohexyl-7-chloro-1,3-dihydro-2H-1,4-benzodiazepine-2-one
3-methyl-5-cyclohexyl-7-chloro-1,3-dihydro-2H-1,4-benzodiazepine-2-one
5-cycloheptyl-1,3-dihydro-2H-1,4-benzodiazepine-2-one
5-cycloheptyl-7-chloro-1,3-dihydro-2H-1,4-benzodiazepine-2-one
1-methyl-5-(2'-pyridyl)-1,3-dihydro-2H-1,4-benzodiazepine-2-one
1-methyl-5-(2'-pyridyl)-7-chloro-1,3-dihydro-2H-1,4-benzodiazepine-2-one
1-methyl-5-(2'-pyridyl)-7-nitro-1,3-dihydro-2H-1,4-benzodiazepine-2-one The salt of the benzodiazepine derivative (I) may be prepared by reacting the benzodiazepine derivative (I) with an acid in a suitable solvent. The salts may be also obtained from the reaction mixture.

The present invention is illustrated more particularly by the following examples. However, it should be understood that the present invention is not limited to them.

EXAMPLE 1

A solution of 3 g. of chromic anhydride in 3 ml. of water is added dropwise to a suspension of 3 g. of 2-amino-methyl-3-(2'-thienyl)-indole hydrochloride in 30 ml. of acetic acid under cooling with stirring. The mixture is stirred at room temperature overnight. The reaction mixture is diluted with water, basified with aqueous ammonia solution and extracted with benzene. The organic layer is washed with water and dried over anhydrous sodium sulfate. The solvent is removed under reduced pressure to a residue, which is crystallized on treatment with benzenehexane and filtered to give 5-(2'-thienyl) - 1,3 - dihydro-2H-1,4-benzodiazepin-2-one, M.P. 197°–198° C.

EXAMPLE 2

Into a suspension of 3 g. of 2-aminomethyl-1-methyl-3-(2'-pyridyl)-indole hydrochloride in 50 ml. of acetic acid is bubbled ozone at 15°–20° C. for 1 hour with stirring.

After the reaction is completed, the reaction mixture is neutralized with aqueous sodium carbonate solution and extracted with chloroform. The chloroform layer is washed with water and dried over anhydrous sodium sulfate.

The solvent is removed by distillation under reduced pressure to a residue, which is recrystallized from ethyl-acetate to give 1-methyl-5-(2'-pyridyl)-1,3-dihydro-2H-1,4-benzodiazepine-2-one, M.P. 199°–200° C.

EXAMPLE 3

In similar way as in Example 1 except that 2- aminomethyl-1-methyl-3-(2'-pyridyl)-indole hydrochloride is replaced by 2-aminomethyl-1-methyl-3-(2'-pyridyl)-5-bromoindole hydrochloride, there is obtained 1-methyl-5-(2' - pyridyl) - 7 - bromo - 1,3-dihydro-2H-1,4-benzodiazepine-2-one, which is recrystallized from ethyl acetate and give crystals having M.P. 135°–137° C.

EXAMPLE 4

In similar way as in Example 1 except that 2-aminomethyl-3-(2'-thienyl)-indole hydrochloride is replaced by 2-aminomethyl-3-cyclohexyl-5-chloro-indole hydrochloride, there is obtained 5-cyclohexyl-7-chloro-1,3-dihydro-2H-1,4-benzodiazepine-2-one, M.P. 170°–171° C.

EXAMPLE 5

In similar way as in Example 1 except that 2-aminomethyl-3-(2'-thienyl)-indole hydrochloride is replaced by 2-aminomethyl-3-cyclopentyl-5-chloro-indole hydrochloride, there is obtained 5-cyclopentyl-7-chloro-1,3-dihydro-2H1,4-benzodiazepine-2-one, M.P. 170°–171° C.

EXAMPLE 6

In similar way as in Example 1 except that 2-aminomethyl-3-(2'-thienyl)-indole hydrochloride is replaced by 2-aminomethyl-3-cyclopentyl-5-chloro-indole hydrochloride, there is obtained 5-cycloheptyl-7-chloro-1,3-dihydro-2H-1,4-benzodiazepine-2-one, M.P. 158°–160° C.

EXAMPLE 7

In similar way as in Example 1 except that 2-aminomethyl-3-(2'-thienyl)-indole hydrochloride is replaced by 2-aminomethyl-3-cyclohexyl-5-chloro-1-methyl-indole hydrochloride, there is obtained 1-methyl-5-cyclohexyl-7-chloro - 1,3 - dihydro - 2H-1,4-benzodiazepine-2-one, M.P. 149°–150° C.

EXAMPLE 8

In similar way as in Example 1 except that 2-aminomethyl-3-(2'-thienyl)-indole hydrochloride is replaced by 2 - aminomethyl-3-(2'-pyridyl)-5-nitro-indole hydrochloride, there is obtained 7-nitro-5-(2'-pyridyl)-1,3-dihydro-2H-1,4-benzodiazepine-2-one, M.P. 253°–255° C.

EXAMPLE 9

In similar way as in Example 2 except that 2-aminomethyl-1-methyl-3-(2'-pyridyl)-indole hydrochloride is replaced by 2-aminomethyl-3-(2'-furyl)-5-chloro-indole hydrochloride, there is obtained 7-chloro-5-(2'-furyl)-1,3-dihydro-2H-1,4-benzodiazepine-2-one, M.P. 245°–246° C.

What is claimed is:

1. A method for producing benzodiazepine derivatives represented by the formula and their acid addition salts,

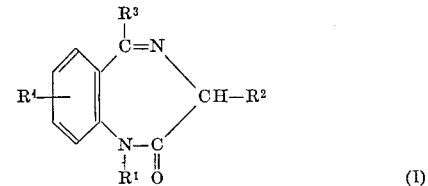

(I)

wherein $R^1$ and $R^2$ are hydrogen or alkyl having 1 to 3 carbon atoms; $R^3$ is cycloalkyl having 3 to 7 carbon atoms, unsubstituted or $C_1$–$C_3$-alkyl- or halogen-substituted pyridyl, pyrrolyl, pyrrolidinyl, furyl or thienyl and $R^4$ is hydrogen, halogen, nitro, alkyl having 1 to 3 carbon atoms, alkoxy having 1 to 3 carbon atoms, trifluoromethyl or $C_2$–$C_3$-alkylsufonyl, which comprises reacting a 2-aminomethylindole derivative represented by the formula,

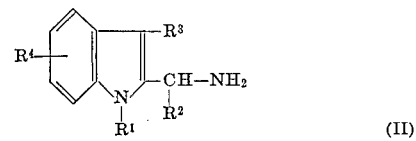

(II)

wherein $R^1$, $R^2$, $R^3$ and $R^4$ have the same meanings as defined above or an acid addition salt thereof, with at least the stoichiometric amount of an oxidizing agent selected from the group consisting of ozone, hydrogen peroxide, performic acid, peracetic acid, perbenzoic acid, chromic acid and potassium permanganate in the presence of a solvent.

2. A method according to claim 1, wherein the oxidizing agent is chromic anhydride or ozone and the reaction is carried out at a room temperature.

3. A method according to claim 1, wherein the solvent is water, acetone, carbon tetrachloride, acetic acid or sulfuric acid.

4. A method according to claim 1, wherein the acid in the acid addition salt of said benzodiazepine and 2-aminomethyl-indole derivatives is hydrochloric, hydrobromic, sulfuric, nitric or acetic acid.

References Cited

UNITED STATES PATENTS 3,371,085  2/1968  Reeder et al. _____ 260—239.3

HENRY R. JILES, Primary Examiner

R. T. BOND, Assistant Examiner

U.S. Cl. X.R.

260—294.8, 296, 326.12, 326.13, 326.15

UNITED STATES PATENT OFFICE
CERTIFICATE OF CORRECTION

Patent No. 3,560,482      Dated February 2, 1971

Inventor(s) Hisao YAMAMOTO et al

It is certified that error appears in the above-identified patent and that said Letters Patent are hereby corrected as shown below:

Column 1, line 12, the correct number of the Japanese application filed Dec. 9, 1967 should read --42/79168-- not "42/791

Signed and sealed this 25th day of January 1972.

(SEAL)
Attest:

EDWARD M. FLETCHER, JR.
Attesting Officer

ROBERT GOTTSCHALK
Commissioner of Patents